United States Patent
Peterson

(10) Patent No.: US 11,638,492 B2
(45) Date of Patent: May 2, 2023

(54) POTTED PLANT TURNTABLE

(71) Applicant: Ryan M. Peterson, Knoxville, TN (US)

(72) Inventor: Ryan M. Peterson, Knoxville, TN (US)

(73) Assignee: Total Manufacturing Solutions, Inc., Knoxville, TN (US)

( * ) Notice: Subject to any disclaimer, the term of this patent is extended or adjusted under 35 U.S.C. 154(b) by 0 days.

(21) Appl. No.: 17/126,950

(22) Filed: Dec. 18, 2020

(65) Prior Publication Data

US 2022/0192399 A1   Jun. 23, 2022

(51) Int. Cl.
*A47G 7/04* (2006.01)

(52) U.S. Cl.
CPC ........ *A47G 7/041* (2013.01); *A47G 2007/048* (2013.01)

(58) Field of Classification Search
USPC ........... 47/39, 66, 6, 71, 40, 40.5, 66.7, 65.5
See application file for complete search history.

(56) References Cited

U.S. PATENT DOCUMENTS

| | | | | |
|---|---|---|---|---|
| 1,859,352 A * | 5/1932 | Albee | ..................... | F16M 11/08 47/39 |
| 2,206,694 A * | 7/1940 | Greene | ..................... | A01G 9/04 47/71 |
| 3,268,198 A * | 8/1966 | Swett | .................. | A47G 19/2283 248/346.11 |
| 4,026,067 A * | 5/1977 | Wengel | ..................... | A01G 9/04 47/39 |
| 4,785,968 A * | 11/1988 | Logan | ..................... | A47J 36/34 99/DIG. 15 |
| 7,093,391 B2 * | 8/2006 | Eakin | ....................... | A01G 9/04 47/79 |
| 8,132,359 B1 * | 3/2012 | Hudak | .................... | A47G 7/041 47/39 |
| 8,356,445 B1 * | 1/2013 | Colquhoun | .............. | A01G 9/04 47/65 |
| 2002/0174599 A1 * | 11/2002 | Rose | ........................ | A01G 9/02 47/65.6 |

FOREIGN PATENT DOCUMENTS

| | | | | |
|---|---|---|---|---|
| JP | H0984468 | * | 3/1997 | |
| KR | 20090091500 | * | 8/2009 | ............. A47G 7/025 |
| KR | 20160047694 | * | 5/2016 | ............. A01G 9/023 |
| WO | PCT WO 2016/010795 | * | 1/2016 | ............... A01G 9/02 |

* cited by examiner

*Primary Examiner* — Andrea M Valenti
(74) *Attorney, Agent, or Firm* — Miller & Martin PLLC; Stephen J. Stark

(57) ABSTRACT

A potted plant turntable including a base and a rotating dish. The rotating dish supports a potted plant which may be rotated with the dish to allow more even exposure of the plant to sunlight. The dish rests on a bearing collar of the base and may be manually rotated or driven by a motor. Drainage holes are spaced from the center of the dish and for many embodiments spaced radially inwardly from an outer edge.

17 Claims, 4 Drawing Sheets

POTTED PLANT TURNTABLE

FIELD OF THE INVENTION

The present invention relates to the field of potted plant accessories, and more particularly to a plant turntable for easily rotating plants in an effort to provide more even solar exposure for more symmetrical growth.

BACKGROUND OF THE INVENTION

As can be seen by reference to the following U.S. Pat. Nos. 4,026,067, 4,051,627, 4,175,354, 4,583,323, 4,969,290, 5,546,698, 6,128,854, 6,230,440, 6,385,899, 7,665,244, 8,356,446, and U.S. Published Application No. US20060081439, and Korean patents KR101341006, KR102074819, and KR20040092353; the prior art is replete with a myriad of diverse plant turntables.

While all of the aforementioned prior art methods are believed to be more than adequate for the basic purpose for which they have been specifically designed to accomplish, they are believed to be uniformly deficient with respect to their failure to provide a simple, efficient, practical potted plant turntable.

As a consequence of the foregoing situation, there has existed a need for a new and improved potted plant turntable and the provision of such a construction is a stated objective of the present invention.

SUMMARY OF THE INVENTION

It is the object of many embodiments of the present invention to provide an improved draining turntable which preferably protects the bearings and pivot or turning mechanism while advantageously removing water from the dish which drains from a potted plant.

It is another object of many embodiments to provide an improved draining system for plant turntables.

Briefly stated, the present invention provides a potted plant turntable including a base and a rotating dish. The rotating dish supports a potted plant which may be rotated with the dish relative to the base to attempt to allow more even exposure of the plant to sunlight. The dish preferably rests on a bearing collar supported by the base and may be turned by hand or driven by a motor possibly controlled by a processor. Drainage holes are preferably spaced from a center of the dish and, for many embodiments, are spaced radially inwardly from an outer edge which direct fluid from an upper surface of the dish to a collection basin on the base. The collection basin preferably drains to an outlet port. The bearings and pivot are preferably separated from the basin by barriers.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE PREFERRED EMBODIMENT

Figure 1:
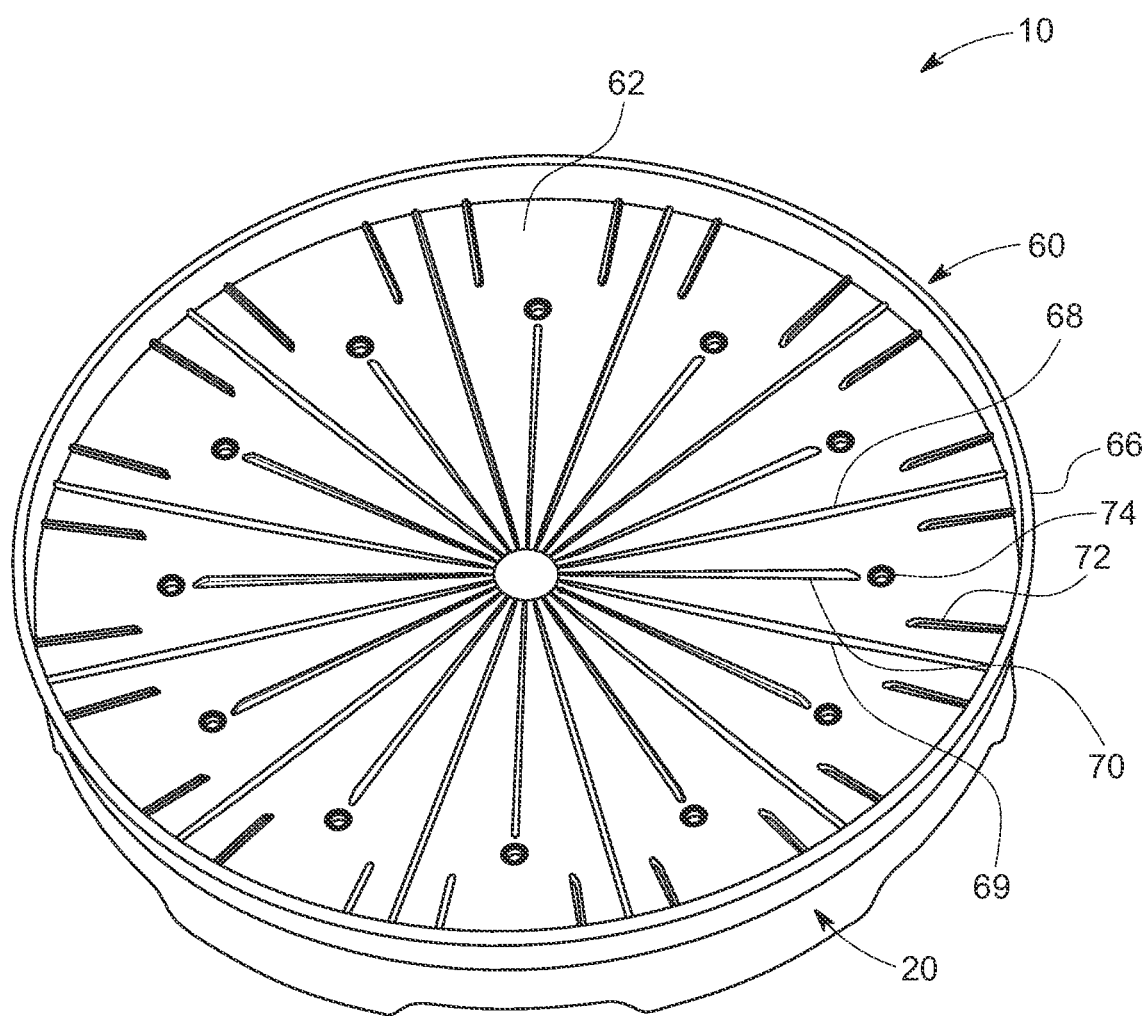
FIG. 1 is a top perspective view of the potted plant turntable of the present invention.

As can be seen by reference to the drawings, and in particular to FIGS. 1-5, the plant turntable that forms the basis of the present invention is designated generally by reference number 10. The turntable 10 includes a base 20. A motor (not shown) may be mounted in, below, or to the base 20 and possibly be coupled to a drive gear 26 to rotate a rotating dish 60 above the base 20 at least partially, there above and/or thereon at pivot 110 or other appropriate location. The motor may be powered by an appropriate power supply not shown, if utilized.

The base 20 receives the rotating dish 60. The dish 60 includes an upper surface 62 and possibly an upwardly extending peripheral lip 64 at an outer edge 65 for receiving and supporting a pot 100 for any of a variety of plants. The underside 66 of the dish 60 may receive a bearing roller or collar 27 at a bearing contact 67 that allows the disc to rotate about the base 20 such as about pivot 110. Bearing contact 67 at least assists in spacing the bearing collar 27 at a desired radius from the edge 76 of the dish 60 and the pivot 110 at the base 20. Rotation of the dish 60 about the pivot 110 results in rotation of the dish 60 relative to the base 20.

The turntable 10 allows the turning of a potted plant to provide a more even distribution of sunlight to all areas of the plant. The turntable dish 60 may be rotated depending on the needs of the plant.

The dish 60 may have a plurality of radially extending ribs such as first, second and third style ribs 68,70,72 which each of said styles may upwardly extend upwardly relative to and from the upper surface 62. Upper surface 62 may be somewhat concave and direct fluid towards drainage holes such as exemplary hole 74. Between first ribs 68 and 69 it is preferable that the slope of the upper surface 62 may assist in directing fluid collected between the first rib 68,69 towards the draining hole 74. Second ribs 70 may extend radially from towards the center 76 to towards the drainage hole(s) 74 and possibly assist in providing a support for a potted plant pot 100 placed thereon as could third ribs 72. Third ribs 62 preferably extend from towards or at the periphery edge 66 radially inwardly towards the center 76. For many embodiments the third ribs 72 may extend towards but not beyond the drainage hole 74.

Drainage holes 74 are preferably radially spaced outwardly relative from the center 76 and radially spaced inwardly relative to the periphery edge 76 preferably at least half of the radius if not about two-thirds or about three-fourths of the radius from the center 76 outwardly towards the outer periphery edge 66. Drainage holes are also preferably located radially inwardly relative to the bearing collar 27 as will be explained in further detail in reference to FIGS. 2 and 3. The drainage holes 74 are preferably located at an elevation so that fluid does not proceed over a top of a top edge 78 of first ribs 68,69 or lip 64 before being directed through the drainage hole 74. Top edge 78 is preferably no taller than upper surface 79 of lip 64 and upper surface 79 may be higher than top edge 78 for many embodiments.

Figure 2:
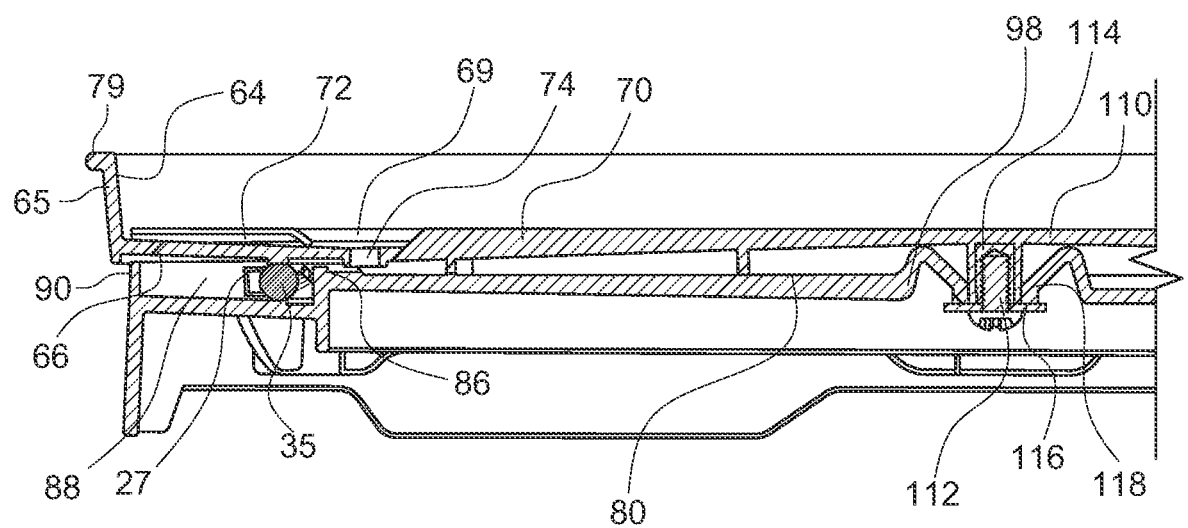
FIG. 2 is a left side cross sectional view of the turntable.
Figure 3:
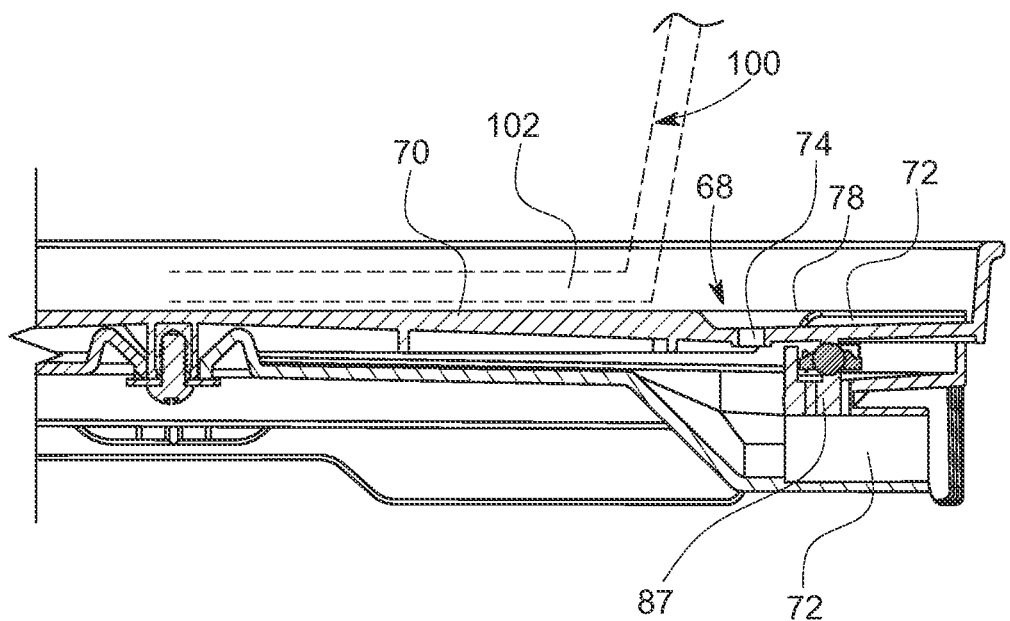
FIG. 3 is a right side cross sectional view thereof with a portion of a potted plant shown in phantom.

FIGS. 2 and 3 show the bottom surface 102 of a pot 100 contacting any or all of first, second or third ribs 68,70,72 etc. depending on the size and placement of the pot 100 on the dish 60.

Figure 4:
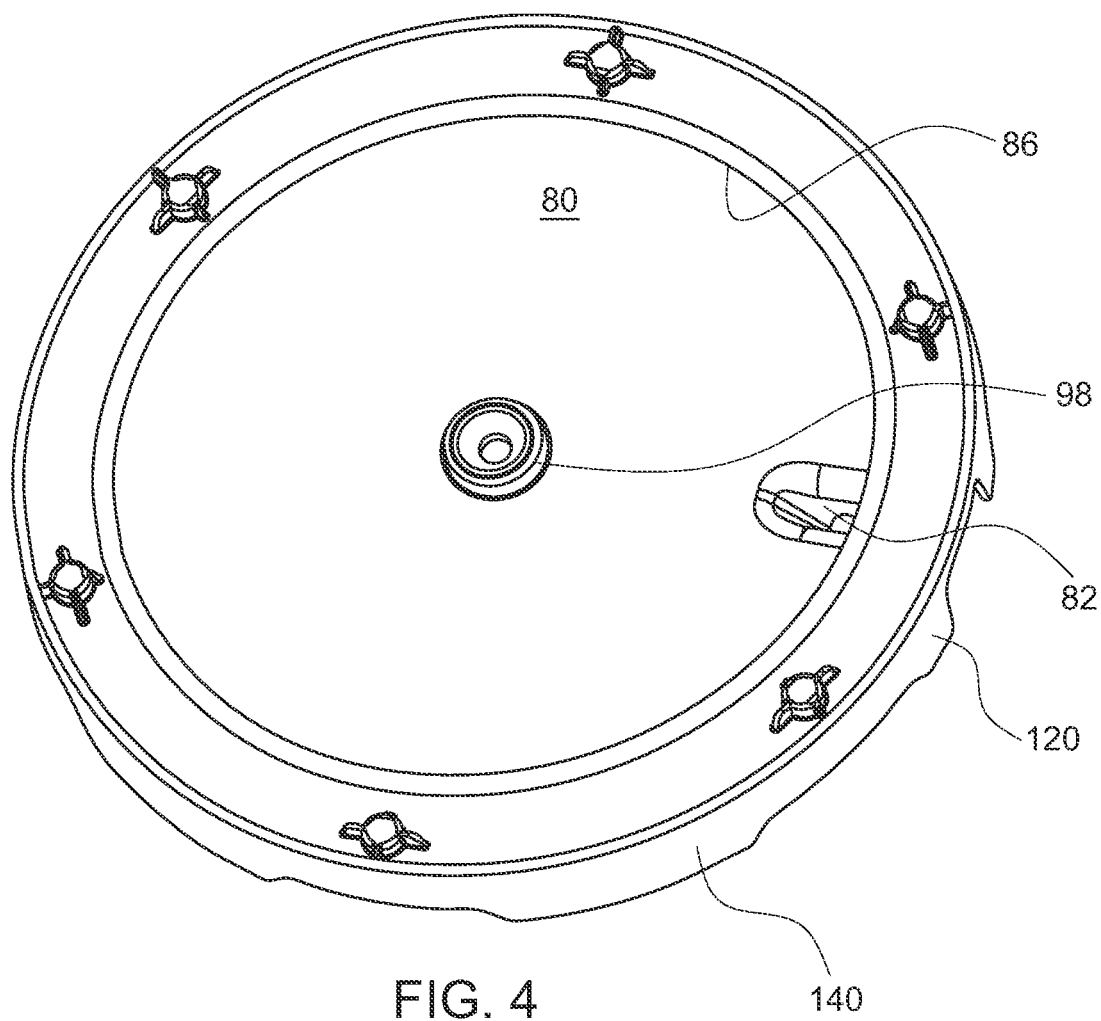
FIG. 4 is a top perspective view of the base with the disc and bearing collar removed.
Figure 5:
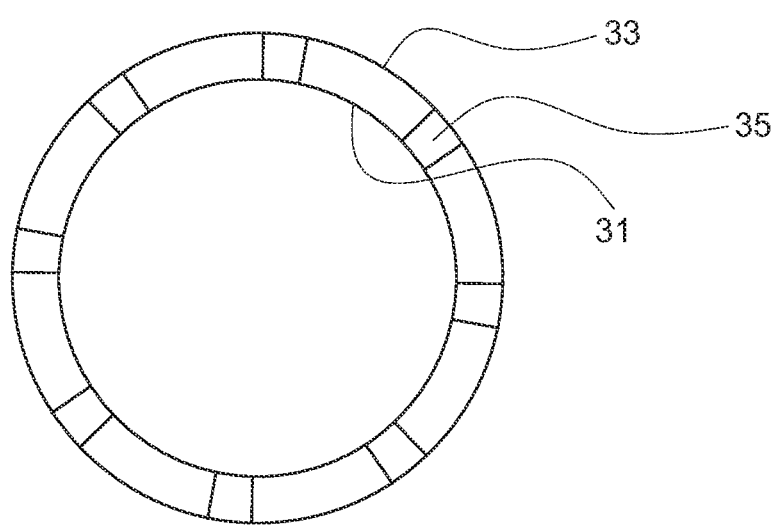
FIG. 5 is a top plan view of a bearing collar removed from FIGS. 1-3.

FIGS. 2-4 show how drainage from the drainage holes 74 would proceed into a collection basin 80 which may be a somewhat convex or other appropriately shaped surface receiving fluid from the drainage holes 74 and draining out drain port 82. A barrier 86 is illustrated located between drainage hole 74 and bearing collar 27 may assist in keeping a bearing compartment 88 dry. Bearing compartment 88 may possibly be assisted in being defined by the first barrier 86, edge 90 and bottom 92 with the bottom 92 possibly assisting in supporting the bearing collar 27 between the base 92 and a bearing contact 94 at the bottom surface 96 of the dish 60. Bearing contact 94 may assist in locating bearing collar 27 at a desired radial position relative to pivot 110. Bearing drain(s) 87 may assist in removing water or other fluid from the bearing compartment 88 if water enters the bearing compartment 88. Bearing collar 27 is illustrated in FIG. 5 as a plurality of bearings, possibly retained between rings 31,33. Rings 31,33 may cooperate with bearing contacts 94,67 to rotate bearings 35 on the bearing contacts 67,94, etc.

Meanwhile the basin may preferably be separated by an interior barrier 98 from the pivot 110. Pivot 110 may take the form of a screw 112 received in a bore 114 possibly assisted in being connected to the base 20 with a washer 116 such as at bottom surface of leg 118 or otherwise. Of course, the illustrated screw 112 could be a shaft of a gear or motor for other embodiments.

Prior art designs either drained off a periphery edge of a turntable or down the center. The center may be better utilized for a pivot 110 for many embodiments than a drain. A periphery edge may better have a lip 64 or it may be that fluid is desired to be drained to a single port rather than off of the entire perimeter of a turntable.

The interior barrier 98 and the first barrier 86 may assist in defining the basin 80 and may be concave or convex surface as appropriate to drain towards the port 82 so that water which passes through the drainage holes 74 preferably passes into the basin 80 and ultimately out the port 82. Base 20 may have downwardly extending legs 120,140 etc.

Unlike prior designs which either drain off an outer peripherally edge of a turntable or to a central bore, a preferred turntable 10 of the present invention can direct fluid from the potted plant(s) 100 through one or more of a plurality of drainage holes 74 into a basin 80 on or in the base. Drainage holes 74 are radially spaced outwardly relative to the pivot 110 at the center 76 of the dish 60 (and base 20) preferably at least half a radius of the dish 60 while possibly radially internally to the bearing chamber 88 and the first barrier 86. The fluid is then directed into the basin 80 which can then discharge out the port 82 which could have a conduit connected thereto for various embodiments to assist in directing waste fluid to a desired location such as a collection location for reuse, etc.

While the pivot 110 is shown having a screw 112 a shaft of a motor or gear could be located at the pivot 110 to mechanize and/or automate with a processor the rotation of the dish 60 relative to the base 20 for various embodiments as would be understood by those of ordinary skill in the art. Other rotation systems such as other prior art systems or those to be developed may be employed with still other embodiments.

The turntable 10 preferably permits rotation of live plants to positively effect an even plant growth pattern. The turntable 10 also may assist in providing for proper plant care.

It is to be understood that the turntable 10 of the present invention may be provided in various sizes, colors, shapes and materials to meet the specific needs of the users.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A plant turntable comprising:
   a base supporting a plurality of bearings in a bearing compartment comprising an outer edge of the base and a first barrier, said bearing compartment radially spaced apart from a pivot centrally disposed and upwardly extending from the base;
   a dish supported on the base and rotatable on the bearings about a center of the dish, the dish operably coupled to the base at the pivot of the base, said dish having drainage holes proceeding through the dish, said holes spaced radially outwardly from the center of the dish and spaced inwardly relative to the outer edge of the dish, said drainage holes separated by radially extending first ribs extending upwardly from the dish, said first ribs extending from toward the center of the dish to an outer edge of the dish and providing a planar horizontal surface at a top of the first ribs, said dish having a downwardly curved upper surface as the upper surface extends away from the center directing fluid downwardly toward at least some of the respective drainage holes between adjacent first ribs which prevent fluid communication through the first rib; and
   wherein the base has a basin with a collection surface located below the drainage holes and above a bottom of the bearings, said basin receiving fluid from the drainage holes and directing fluid towards an outlet port; and wherein the collection surface of the basin is located between the first barrier and an upwardly extending interior barrier separating fluid collected in the basin from the pivot, and fluid collected on the collection surface of the basin drains out of the outlet port before passing over the interior barrier with the outlet port disposed completely radially outwardly of the drainage holes; and wherein the fluid collected on the collection surface of the basin is directed under the bearings of the base to the outlet port.

2. The plant turntable of claim 1 wherein the basin has the first barrier upwardly extending in the basin, whereby fluid in the basin drains out the outlet port before passing over the first barrier.

3. The plant turntable of claim 1 wherein the bearings are a portion of a bearing collar.

4. The plant turntable of claim 3 wherein the bearing collar is at least partially positioned on a bearing contact of the base with the bearing contact assisting in retaining the bearing collar a desired radial position relative to the pivot.

5. The plant turntable of claim 4 wherein the bearing collar is at least partially positioned on a bearing contact of the dish with the bearing contact assisting in retaining the bearing collar a desired radial position relative to the center of the dish.

6. The plant turntable of claim 1 wherein the bearings are a portion of a bearing collar.

7. The plant turntable of claim 6 wherein the bearing collar is at least partially positioned on a bearing contact of the base with the bearing contact assisting in retaining the bearing collar a desired radial position relative to the pivot.

8. The plant turntable of claim 7 wherein the bearing collar is at least partially positioned on a bearing contact of the dish with the bearing contact assisting in retaining the bearing collar a desired radial position relative to the center of the dish.

9. The plant turntable of claim 1 wherein the outer edge of the dish has an upwardly extending lip retaining fluid on the upper surface of the dish until draining through the drainage holes.

10. The plant turntable of claim 9 wherein the upper surface is concavely directed towards the drainage holes from towards the center of the dish.

11. The plant turntable of claim 1 further comprising a second rib type extending radially away from the center but terminating internal to the dish spaced apart from the outer edge, said second rib type located intermediate first ribs.

12. The plant turntable of claim 11 wherein the second rib type has an upper surface coplanar with the first ribs.

13. The plant turntable of claim 11 further comprising a third rib type extending radially inwardly from the outer edge towards the center but terminates internal to the dish spaced apart from the center.

14. The plant turntable of claim 13 wherein the third rib type has an upper surface coplanar with the first ribs.

15. The plant turntable of claim 1 wherein the drainage holes are radially spaced at least half of a radius of the dish away from the center.

16. The plant turntable of claim 15 wherein the drainage holes are radially spaced at least two thirds of the radius of the dish away from the center and radially inwardly of the bearings.

17. The plant turntable of claim 1 wherein fluid in the basin drains by gravity towards the port.

* * * * *